Dec. 7, 1971   TAKASHI MATSUBAYSHI ET AL   3,624,955
DISC-SHAPED BLOCKS WITH CYLINDRICAL PROJECTIONS
AND CONCENTRIC WALLS
Filed Feb. 6, 1969                          3 Sheets-Sheet 1

INVENTOR
TAKAHASHI MATSUBAYASHI
HIROZO MATSUBAYASHI
BY
AGENT

United States Patent Office 3,624,955
Patented Dec. 7, 1971

3,624,955
DISC-SHAPED BLOCKS WITH CYLINDRICAL
PROJECTIONS AND CONCENTRIC WALLS
Takashi Matsubayashi and Hirozo Matsubayashi, Habi-kino-shi, Japan, assignors to Nintendo Playing Card Co., Ltd., Kyoto-shi, Kyoto, Japan
Filed Feb. 6, 1969, Ser. No. 797,164
Claims priority, application Japan, Feb. 17, 1968, 43/11,821; May 27, 1968, 43/43,677
Int. Cl. A63h 33/08
U.S. Cl. 46—25                                10 Claims

ABSTRACT OF THE DISCLOSURE

Each block of the mutually couplable assembling toy has a disc base plate, on one side of which is provided one or more cylindrical walls projecting vertically and concentrically therefrom and on the other side are provided plural cylindrical projections. The block of one embodiment has a cylindrical outermost wall and the block of another embodiment has a partially conical outermost wall. These walls and projections are arranged and constructed so that at least some of the projections of one block are fitted between the walls of another block when piled one on another.

BACKGROUND OF THE INVENTION

The present invention relates to an assembling toy of mutually couplable blocks and more particularly to an assembling toy of disc type blocks having a cylindrical or partially conical outermost wall.

A mutually couplable assembling toy is known. However, the prior assembling toy consisted of square type blocks only, so that the variety in assembling the blocks was significantly limited and because of its square type the manufacturing tolerance was very severe.

Accordingly, it is a primary object of the present invention to provide an assembling toy of mutually couplable disc blocks having a cylindrical or partially conical outermost wall.

Another object of the present invention is to provide mutually couplable blocks which may be manufactured economically without requiring high mechanical precision.

Another object of the present invention is to provide assembling blocks each of which may be smoothly fitted to be coupled with and be detached from another.

Still another object of the present invention is to provide mutually couplable blocks as above having a more flexible wall structure.

SUMMARY OF THE INVENTION

According to the present invention, an assembling toy of mutually couplable blocks is provided, each block of which has a disc base plate. In one embodiment of the present invention the disc plate has a cylindrical peripheral wall projecting on one side thereof and in another embodiment it has an oblique or partially conical peripheral wall.

Inside, the peripheral wall of the disc is provided with one or more cylindrical walls projecting concentrically and vertically from the disc base plate on the same side of the peripheral wall. On the other side of the plate opposing the walls are provided a plurality of cylindrical projections which are so constructed and arranged that the projections of one block are selectively fitted between the walls of another block when being piled one on another.

DESCRIPTION OF THE PREFERRED EMBODIMENTS

Figure 1:
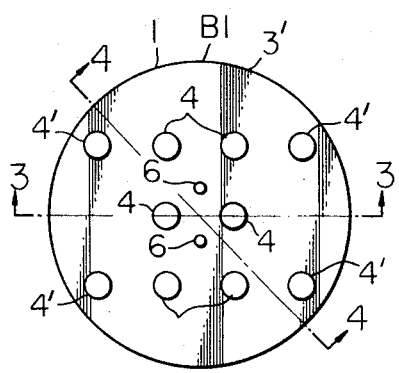
FIG. 1 is a plan view of a major size block according to one embodiment of the present invention.
Figure 5:
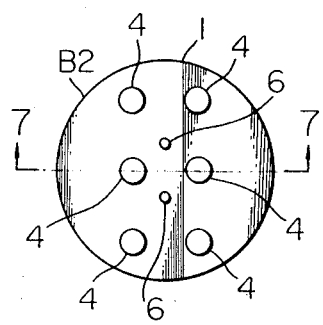
FIG. 5 is a plan view of a minor block according to the first embodiment of the present invention.
Figure 2:
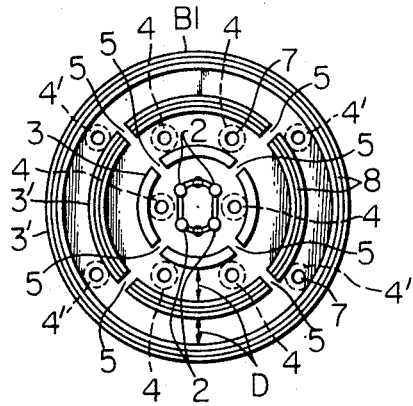
FIG. 2 is a bottom view of the block shown in FIG. 1.
Figure 6:
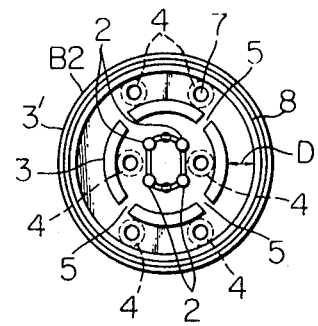
FIG. 6 is a bottom view of the block shown in FIG. 5.
Figure 3:
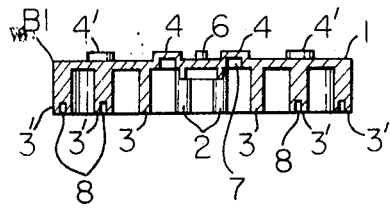
FIG. 3 is a sectional view along the line 3—3 in FIG. 1.
Figure 7:
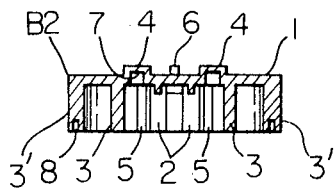
FIG. 7 is a sectional view along the line 7—7 in FIG. 5.
Figure 4:
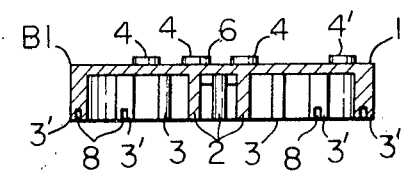
FIG. 4 is also a sectional view along the line 4—4 in FIG. 1.
Figure 8:
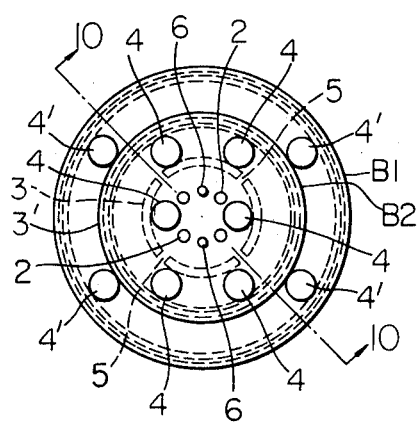
FIG. 8 is a plan view of the major block (shown in FIGS. 1 to 4) and the minor block (shown in FIGS. 5 to 7) assembled one upon the other.
Figure 11:
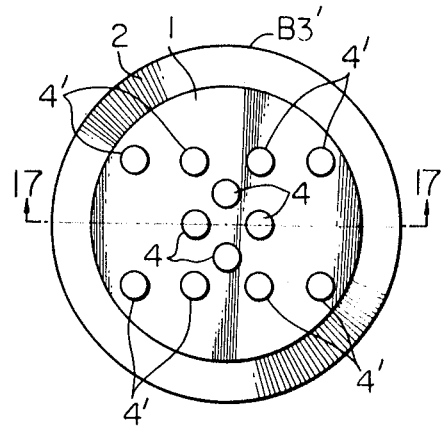
Figure 9:
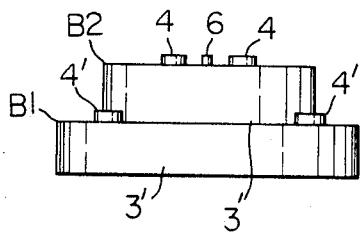
FIG. 9 is a side view of the blocks shown in FIG. 8.
Figure 12:
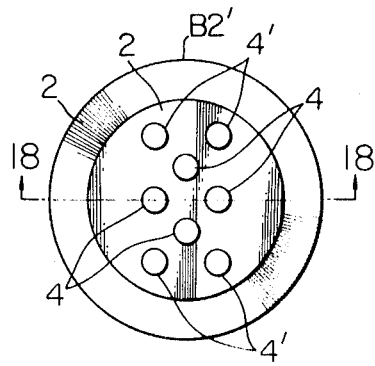
Figure 10:
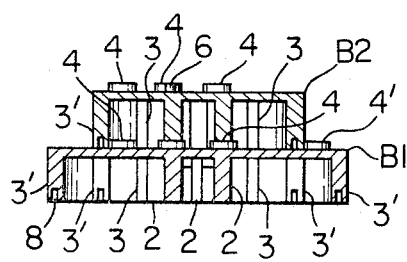
FIG. 10 is a sectional view along the line 10—10 in FIG. 8,
FIGS. 11 through 13 are plan views of the major, medium and minor blocks according to a second embodiment of the present invention.
Figure 13:
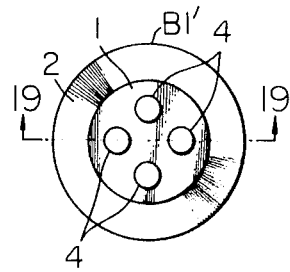
Figure 14:
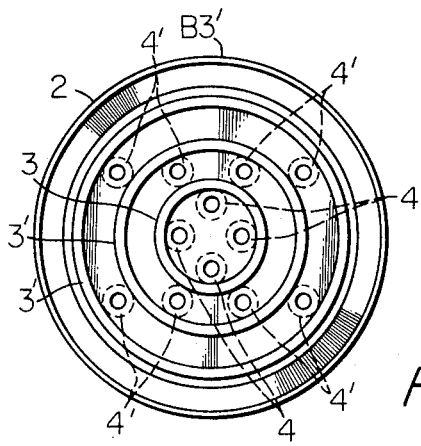
FIGS. 14 through 16 are bottom views of the blocks of FIGS. 11 through 13, respectively.
Figure 15:
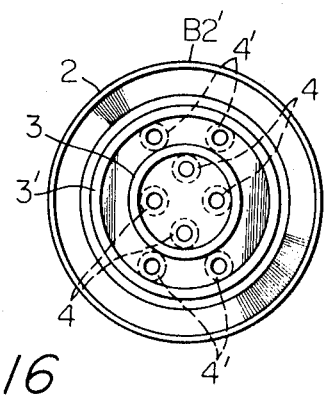
Figure 16:
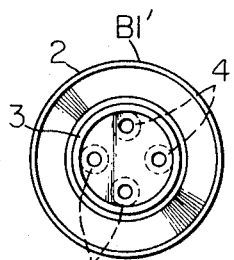
Figure 17:
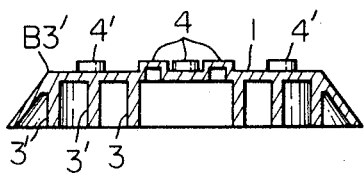
FIG. 17 is a sectional view along the line 17—17 of FIG. 11.
Figure 18:
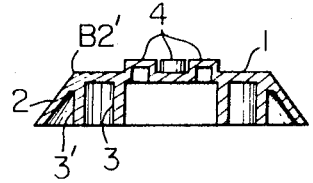
FIG. 18 is a sectional view along the line 18—18 of FIG. 12.
Figure 19:
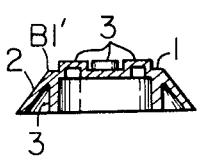
FIG. 19 is a sectional view along the line 19—19 of FIG. 13.
Figure 20:
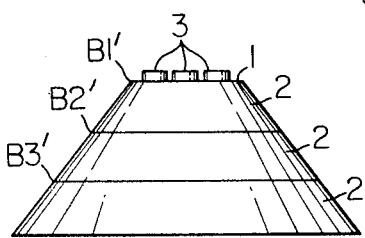
FIG. 20 is a front view of the major, medium and minor blocks (shown in FIGS. 11 to 19) assembled into one body.

Referring to FIGS. 1 through 10 showing one embodiment of the present invention:

A major block $B_1$ or a minor block $B_2$ comprising a cylindrical disc 1, is provided with four cylindrical legs 2, 2, 2, 2 erected in the central area of the under surface thereof equally spaced apart from each other. The undersurface is provided with a circular vertical wall 3 surrounding said four legs, and is further provided with one or more larger circular vertical walls 3' concentric with said wall 3, one of which depends from the periphery of the disc 1. The upper surface is provided with a plurality of cylindrical projections 4 adapted to fit selectively between the walls 3, 3'. The distances D, D between the circular vertical wall 3 and the wall 3' surrounding it (FIG. 6) or between the wall 3' and still another such wall 3' as in the major disc B, (FIG. 2), respectively, are made to be equal to the diameter $d$ of the cylindrical projections 4, the upper surface of the cylindrical disc 1. The diameter of the cylindrical projection 4 being so dimensioned that when assembled, the peripheral surface thereof will contact with the inner wall surface of said innermost vertical wall 3 together with the peripheral surfaces of any adjacent two out of said four cylindrical legs 2, 2, 2, 2 of the adjacent block, or, in another combination, with all the four cylindrical legs 2, 2, 2, 2. The circular vertical wall 3, and each surrounding vertical wall 3', which is not the outermost wall, is provided with a suitable number of interstices 5, respectively. The cylindrical projections 4 are arranged at equal distances to each other and in two rows parallel to each other on the upper surface of the cylindrical disc 1. Two smaller cylindrical projections 6 are provided along the center line of the parallel rows of cylindrical projections 4. Furthermore, four cylindrical projections 4', 4', 4', 4' are provided outwards of the front and rear projections 4 in the two rows, as in the major disc B, (FIG. 2). Further, hollows or slots 8 are provided at the bottoms of circular vertical walls 3, 3' for the purpose of material saving and for permitting increased flexibility. Hollows 7 are also provided at the bottom or opposite side of the cylindrical projections 4 or 4' for saving material.

By virtue of the construction of the cylindrical disc according to this embodiment the outermost peripheral wall 3' is provided concentrically to the circular vertical wall 3 on the under side of the cylindrical disc 1, the interval distances D, D, are made to be equal to the diameter d of the cylindrical projection 4 provided on the upper side of the cylindrical disc, and said cylindrical projections 4 are disposed in two rows having equal distances therebetween. Thus, there will be accomplished such a functional relation between cylindrical projections and circular vertical walls, as may be seen in FIGS. 2 and 6, that when assembled the periphery of each of the middle two of the parallel two rows of six cylindrical projections 4 will contact with the inner surface of the inner circular vertical wall 3 together with either pair of cylindrical legs 2 to the left or right of the set of legs 2, 2, 2, 2. Four of the outer projections 4, i.e., not the middle two, will contact the innermost circular vertical wall 3 and the inner periphery of the vertical wall 3' outer than the wall 3. The major blocks $B_1$ may thus be piled one upon another having been fitted one into another. The minor blocks $B_2$ may also be similarly piled. Taking the major blocks $B_1$ alone, a larger cylindrical column may be built, or taking minor blocks $B_2$ alone, a smaller cylindrical column may be built, or taking suitable numbers of both the blocks $B_1$ and $B_2$, respectively, a cylindrical column having varying diameters with respect to the height thereof may be constructed. Further, as the blocks are provided with circular vertical walls 3, 3' formed concentrically to each other they may also be combined with a square block, provided that such a block also has cylindrical projections disposed in two rows at equal distance therebetween at a diameter equal to the diameter D of the above cylindrical projection 4 and a thickness and radii of concentric circular vertical walls 3 and 3' corresponding to the disc 1. The concentric vertical walls 3, 3' of the block are provided with the interstices 5 as well as the slots 8, to provide a high degree of flexibility is, therefore highly improved as compared which is an improvement over devices having a unitary cylindricall wall of rather hard material. The high flexibility of the disc does allow a certain leeway in tolerance when forming the products so that no waste will be resulting in an economcal advantage in manufacturing. The cylindrical disc blocks according to the present invention are not only capable of building any desired configuration different from that made from the square block, but also they may be used together with square blocks to create many more attractive and varied constructions. The cylindrical disc blocks of the present invention are particularly suitable for building cylindrical configurations.

Referring to FIGS. 11 through 21 there is shown another embodiment of the present invention:

A minor sized block $B_1$ is formed according to the embodiment and is defined by an upper circular disc 1, and a downwards opened partially conical wall or frustum 2 in continuation therefrom, wherein are provided circular vertical walls 3, 3' and legs. Within conical walls 2 are a plurality of cylindrical projections 4 suitably arranged on said upper circular disc 1. The projections 4 are disposed to make contact with said circular vertical walls 3 of another block, when a plurality of blocks are assembled.

A medium sized block $B'_2$ as well as a major block $B'_3$ are also similarly provided. These blocks have respective downwardly opened partial conical walls 2 in continuation from the respective circular discs 1, and circular vertical walls 3 in the respective center area within the conical walls 2. The circular disc 1 of each of the blocks has a plurality of cylindrical projections 4 suitably disposed thereon, which are adapted to contact with the inner wall of the innermost circular vertical wall 3 of an adjacent block, and is provided with one or more concentric vertical walls 3' of larger diameter. The circular disc 1 is further provided with cylindrical projections 4' in addition to the projections 4, which projections 4' are positioned so as to contact concentric circular vertical walls 3, 3 and 3', or 3' and 3', selectively.

Figure 21:
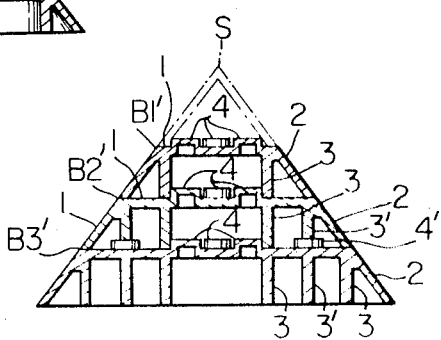
FIG. 21 is a longitudinal section of the associated blocks of FIG. 20.

As any of the previously described blocks, according to the other feature of the blocks of this second embodiment may be fitted or coupled with one another by piling one upon another. If the innermost circular vertical wall 3 is made in the same size in each of the major, medium and minor blocks $B'_3$, $B'_2$ and $B'_1$, and the oblique angle of the partially conical wall 2 also is common to each of them, they may be assembled or built into a cone as shown in FIG. 21. An auxiliary wherein an auxiliary cone block "S" may be added on the top surface of the minor block $B'_1$ completed the cone configuration. In assembling, any suitable number of major, medium and minor blocks, respectively, may be selected for building a column. A column consisting of frustum blocks of various diameters may be created to have numerous varieties of entertaining appearances. Various constructions can be obtained if the builder merely exerts his ingenuity.

As the interior construction of the block body according to the present invention is very simple, it provides particular advantage in that the blocks may be molded of plastics for which the metallic mould can be prepared in an easy and economical manner precisely dimensioned concentric vertical mold walls will produce excellently fittable coupling blocks. The exposed or empty cylindrical projections of the uppermost block or those cylindrical projections 4' of the medium and major blocks piled at intermediate positions of any column formed of blocks of the second embodiment may be utilized to couple blocks of the first embodiment such as shown in FIGS. 1 through 10. The more varieties of configurations attained the more is the toy.

In the above description, only frustum blocks having a downwardly opened oblique peripheral wall 2 are described. Blocks having an upwardly opened peripheral wall may be formed, which could develop substantially similar forms to those described. It will be understood that those blocks having upwardly opened oblique peripherall wall are included in the scope of the present invention.

Although the foregoing invention has been described in some detail, by way of illustration and explanation for purposes of clarity of understanding, it is understood that the important feature of the present invention is a block having a disc, a plurality of concentric, vertical walls provided on one side thereof, and a plurality of projections on the other side wherein said walls and projections are so constructed and arranged that when blocks are piled one onto another, some projections of one block enter the spaces between the walls of another block and their peripheral surfaces contact with the peripheral walls of said walls, and also that certain changes and modifications may be practiced within the spirit of the invention and scope of the appended claims.

What is claimed is:

1. An assemblable toy comprising a plurality of blocks each of which is a circular disc, having opposed faces, one of said faces having concentrically erected thereon a circular inner wall and, spaced from said inner wall, an outer wall along the periphery of said disc, the other opposed face having erected thereon a group of at least six cylindrical projections of the same dimensions aligned in a set of two rows in a first direction and in a set of three rows in a second direction perpendicular to the first direction, said group being arranged symmetrically with respect to the center of said disc, each of said projections being spaced equidistantly from an adjacent one of said group, the diameter of the inner wall being equal to the diameter of a circle circumscribed about the two innermost projections of said group, and the space between the inner and outer walls being equal to the diameter of each projection so that, when two blocks of the same structure and dimension are assembled one upon the other, the peripheral surfaces of said two innermost projections of one block contact the inner peripheral surface of the inner wall of the other block and the peripheral surface of the outer four projections of said group of the one block contact the outer peripheral surface of the inner wall and the inner peripheral surface of the outer wall of the other block, whereby the two blocks are assembled into a single body.

2. The toy according to claim 1, including an outermost wall extending obliquely and tapering outwardly from said disc.

3. The toy according to claim 1, including a pair of additional cylindrical projections of the same dimension as that of said group of projections, said additional projections being erected on said other opposed face at the respective centers between the rows of said set of three rows and forming with said two innermost projections an array of four mutually adjacent projections equidistantly spaced from each other about the center of said disc.

4. The toy according to claim 3, including an outermost wall extending obliquely and tapering outwardly from said disc.

5. The toy according to claim 1, wherein said projections are hollow.

6. An assemblable toy comprising a plurality of blocks each of which is a circular disc, having opposed faces, one of said faces having concentrically erected thereon inner, middle and outer walls of the same height, said outer wall being along the periphery of said disc, the other opposed face having erected thereon a group of ten cylindrical projections of the same dimensions aligned in a set of four rows in a first direction and in a set of three rows in a second direction perpendicular to the first direction, said group being arranged symmetrically with respect to the center of said disc, and the outer two positions in the middle row in the second direction are free of projections, each of said projections being spaced equidistantly from an adjacent one of said group, the diameter of the inner wall being equal to the diameter of a circle circumscribed about the two innermost projections of said group, and the spaces between the inner and middle walls and the middle and outer walls being equal to the diameter of said projections so that, when two blocks of the same structure and dimension are assembled one upon the other, the peripheral surfaces of the two innermost projections of one block contact the inner peripheral surface of the inner wall of the other block, the peripheral surface of four of the remaining projections of the one block contact the outer peripheral surface of the inner wall and the inner peripheral surface of the middle wall of the other block, and the peripheral surface of the remaining and outermost four of said projections of the one block contact the outer peripheral surface of the middle wall and the inner peripheral surface of the outer wall of the other block, whereby the two blocks are assembled into a single body.

7. The toy according to claim 6, including an outermost wall extending obliquely and tapering outwardly from said disc.

8. The toy according to claim 6, including a pair of additional cylindrical projections of the same dimension as that of said group of projections, said additional projections being erected on said other opposed face at the respective centers between the rows of said set of three rows and forming with said two innermost projections an array of four mutually adjacent projections equidistantly spaced from each other about the center of said disc.

9. The toy according to claim 8, including an outermost wall extending obliquely and tapering outwardly from said disc.

10. The toy according to claim 6, wherein said projections are hollow.

References Cited

UNITED STATES PATENTS

| | | | |
|---|---|---|---|
| 3,034,254 | 5/1962 | Christiansen | 46—25 |
| 3,233,358 | 2/1966 | Dehm | 46—25 |
| 3,234,683 | 2/1966 | Christansen | 46—25 |
| 3,236,004 | 2/1966 | Christiansen | 46—23 |
| 3,479,763 | 11/1969 | Fischer | 46—25 |
| 3,487,579 | 1/1970 | Brettingen | 46—25 |

FOREIGN PATENTS

| | | | |
|---|---|---|---|
| 50,222 | 11/1966 | East Germany | 46—25 |
| 1,259,001 | 3/1961 | France | 46—25 |

OTHER REFERENCES 1,216,168—Doring—West German application published May 5, 1966.

F. BARRY SHAY, Primary Examiner